Oct. 18, 1938.  G. P. JACKSON  2,133,703
SLAGGING FURNACE
Filed Feb. 24, 1936  3 Sheets-Sheet 1

INVENTOR
George P. Jackson
BY
Synnestvedt & Lechner
ATTORNEYS

Oct. 18, 1938.  G. P. JACKSON  2,133,703
SLAGGING FURNACE
Filed Feb. 24, 1936   3 Sheets-Sheet 2

INVENTOR
George P. Jackson
BY
Synnestvedt + Lechner
ATTORNEYS

Oct. 18, 1938.   G. P. JACKSON   2,133,703
SLAGGING FURNACE
Filed Feb. 24, 1936   3 Sheets-Sheet 3

INVENTOR
George P. Jackson
BY
Symmestvedt & Lechner
ATTORNEYS

Patented Oct. 18, 1938

2,133,703

UNITED STATES PATENT OFFICE 2,133,703

SLAGGING FURNACE

George P. Jackson, Flushing, N. Y., assignor to Combustion Engineering Company, Inc., New York, N. Y., a corporation of Delaware Application February 24, 1936, Serial No. 65,213

13 Claims. (Cl. 122—235)

This invention relates to slagging furnaces and in particular to improvements in the bottom construction of slagging furnaces in which liquid slag discharges through an opening extending through the bottom.

One of the primary objects of my invention resides in the provision of an improved cooled liquid slag discharge opening for furnaces of the above character.

Another object of my invention is the provision of tubular means for providing a cooled lip for the liquid slag discharge opening of such furnaces having novel features, as will appear hereinafter.

How the foregoing, together with such other objects and advantages as may hereinafter appear or are incident to my invention, are realized, is illustrated in the preferred form in the accompanying drawings, wherein—

Figure 1:
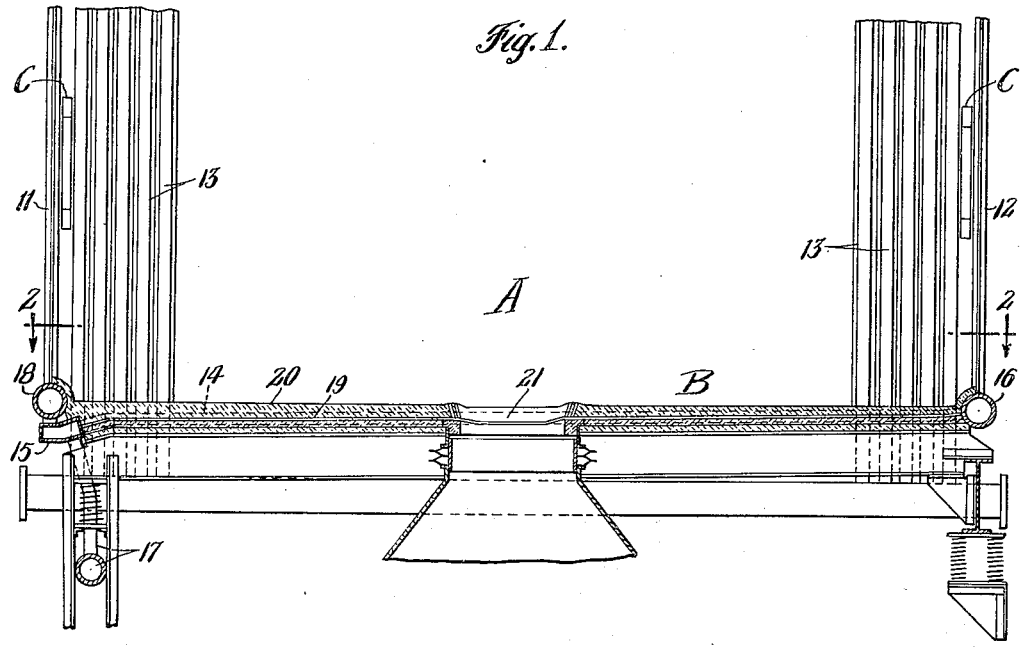
Figure 1 is a fragmentary sectional elevational view of the lower portion of a slagging furnace embodying my invention.

In Figure 1 I have illustrated the lower portion of a combustion chamber A of a boiler and furnace installation having a bottom B constructed in accordance with my invention; front, rear, and side walls which are provided with upright steam evaporating tubes 11, 12, and 13 in a well known manner; and burner means C for introducing fuel, such as pulverized coal and air, into the combustion chamber. In this instance I have indicated the burner means as being located at the corners of the combustion chamber for vortical firing.

The bottom B comprises a plurality of closely spaced water tubes 14, preferably inclined slightly from the horizontal to prevent steam pocketing and connected at one end into a header 15 and at their other ends into a header 16. Water is supplied to the bottom tubes 14 by downcomer means 17 leading from water space of the boiler and having connection into the header 15, and delivery from the bottom tubes 14 is to the upright tubes 12 of the combustion chamber through the medium of the header 16. Water may be supplied to the upright tubes 11 by means of connections between the header 15 and the lower header 18.

Horizontally extending fins 19 are provided on the tubes 14 to substantially close the spaces therebetween and a lining 20 of refractory material, such as chromium ore, covers the tubes and fins to provide a smooth floor surface. As illustrated in Figure 1, the lining 20 tapers in thickness from end to end so as to provide a horizontal top surface for the floor.

Figure 2:
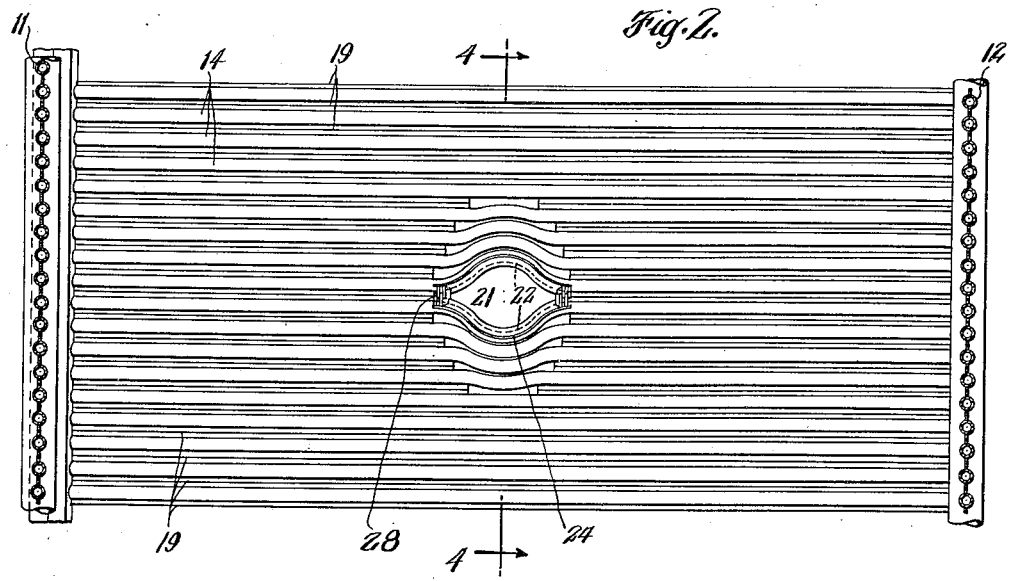
Figure 2 is a fragmentary plan section taken on the line 2—2 of Figure 1 with the lining for the bottom tubes omitted.

Certain of the bottom tubes 14, as is clearly illustrated in Figure 2, are bent so as to have curved or bowed portions arranged to provide a liquid slag discharge opening 21 extending through the bottom. Of these bent tubes the pair 22 define the periphery of the opening 21 and serve to cool it, or, stated in another way, the pair of tubes 22 provide a cooled lip for the opening 21 over which the discharging liquid slag flows.

Figure 3:
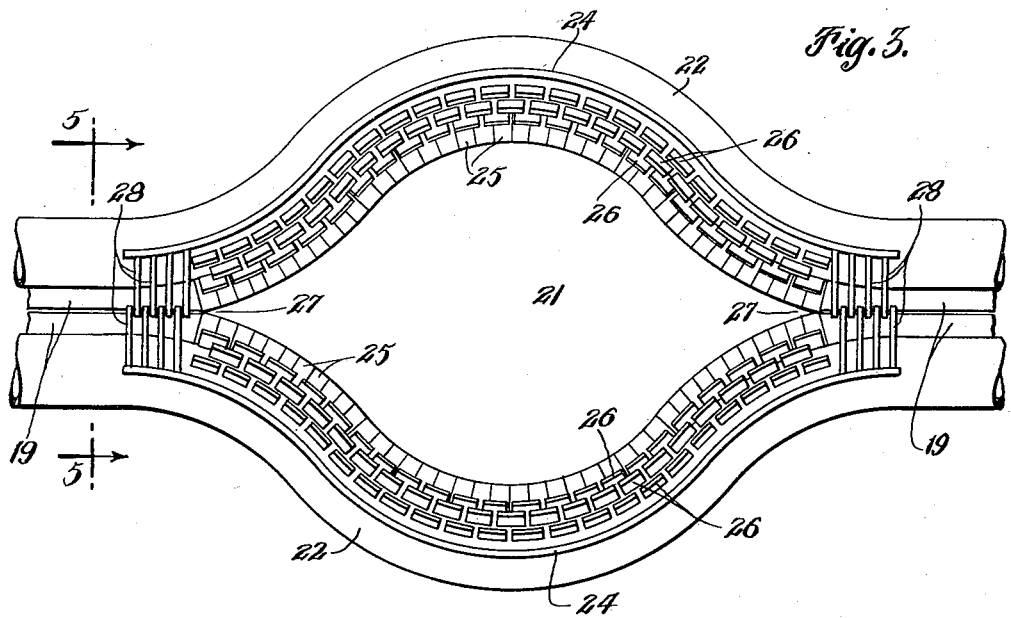
Figure 3 is an enlarged fragmentary plan view of the construction of the slag discharge opening illustrated in Figure 1.
Figure 4:
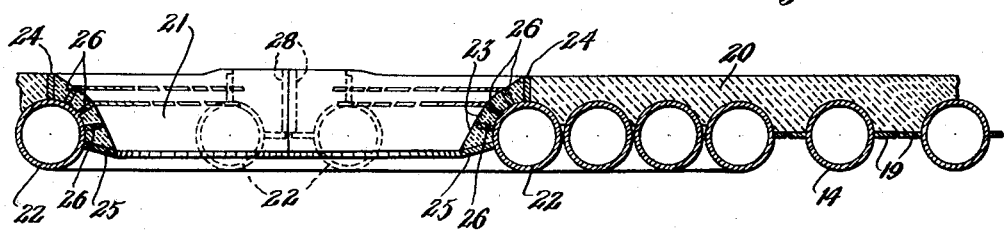
Figure 4 is an enlarged fragmentary cross-section taken on the line 4—4 of Figure 2.
Figure 5:
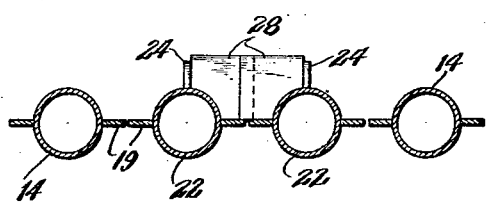
Figure 5 is a fragmentary cross-section taken on the line 5—5 of Figure 3.

I have provided refractory means on the peripheral tubes 22 for protecting them from destructive action of the discharging liquid slag and, as illustrated in Figures 1 to 5 inclusive, this means comprises a plurality of projections carried by the tubes for retaining refractory material 23, such as chromium ore, in place. The projections are preferably in the form of radially disposed fins spaced apart circumferentially of the tubes and comprise upper upright fins 24, lower inclined fins 25, and a plurality of rows of intermediate fins 26. I prefer to make the upper fins 24 as single continuous fins and the remaining fins 25 and 26 of a plurality of sections. The sections of the intermediate fins 26 are arranged in staggered relation, as shown in Figure 3, so as to more securely retain or anchor the refractory lining material in place. The lower inclined fins 25 form a drip ledge for the liquid slag, as is clearly shown in Figure 4. This drip ledge ensures that the liquid slag will drip down from the opening whether it is running over in a small amount or in a large amount. It is also pointed out that the construction and arrangement of the projections or fins is such that the exposed or lip surface of the refractory lining material is inclined whereby this surface is effectively exposed to radiant heat in the furnace, thus preventing accumulation of slag thereon.

At the ends 27 of the opening 21 I employ overlapping upright fins 28 extending crosswise of the tubes, and these are preferably made slightly higher than the upright fins 24 so that the tendency of the liquid slag will be to overflow at the other portions of the opening and thus prevent a run, so to speak, at these end portions.

Figure 6:
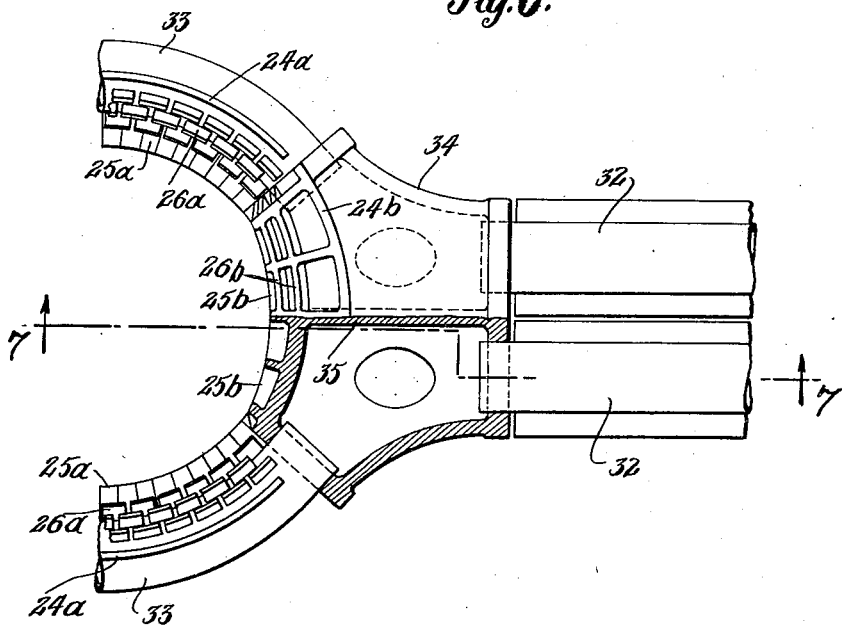
Figure 6 is a fragmentary plan view of another modification of my invention with a portion thereof appearing in section.
Figure 7:
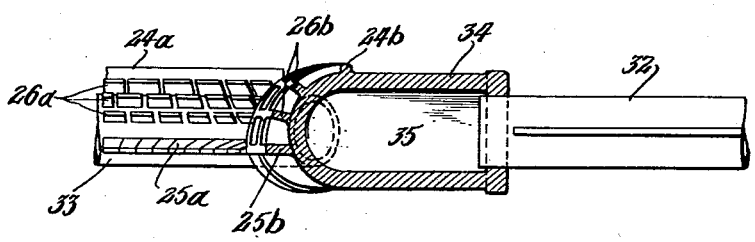
Figure 7 is a section taken on the line 7—7 of Figure 6.

In the modification illustrated in Figures 6 and 7, the tubes which correspond to the pair of tubes 22 above described are of sectional construction comprising straight and curved tube sections 32 and 33 and junction boxes or connecting headers 34. I have only shown one half of the opening in these figures, but the construction of the other half is the same. The junction boxes 34 are provided with partitions 35 dividing them into two chambers so as to ensure flow through both curved sections. The curved sections 33 are provided with refractory retaining projections or fins 24a, 25a and 26a similar to those described in connection with Figures 1 and 5. Similarly arranged fins 24b, 25b and 26b are provided on the junction boxes 34.

It will be seen from the foregoing that I have provided an improved bottom construction for slagging furnaces which will have long life and in which the liquid slag will flow continuously toward and through the discharge opening without pooling on the furnace bottom.

I claim:

1. In a furnace for burning slag forming fuel, the combination of a combustion chamber, and a bottom for said chamber comprising spaced water tubes certain of which have bowed portions to provide a liquid slag outlet in the bottom, projections on the bowed portions of the tubes which define the periphery of said outlet, and refractory material retained by said projections to line the periphery of said outlet.

2. In a furnace for burning slag forming fuel, the combination of a combustion chamber, and a bottom for said chamber comprising spaced water tubes certain of which have bowed portions to provide a liquid slag outlet in the bottom, radially extending projections on the bowed portions of the tubes which define the periphery of said outlet, and refractory material retained by said projections to line the periphery of said outlet.

3. In a furnace for burning slag forming fuel, the combination of a combustion chamber, and a bottom for said chamber comprising spaced water tubes certain of which have bowed portions to provide a liquid slag outlet in the bottom, a plurality of radially extending fins on the bowed portions of the tubes which define the periphery of said outlet, and refractory material retained by said fins to line the periphery of said outlet.

4. In a bottom for slagging furnaces having a liquid slag discharge opening extending therethrough, the combination of tubular cooling means arranged to provide a cooled lip for said opening; refractory material lining said lip; and means on said tubular cooling means for retaining said refractory material in place comprising fins extending longitudinally of and spaced apart circumferentially of the tubular cooling means.

5. In a bottom for slagging furnaces having a liquid slag discharge opening extending therethrough, the combination of tubular cooling means arranged to provide a cooled lip for said opening; refractory material lining said lip; and means on said tubular cooling means for retaining said refractory material in place comprising a plurality of rows of fins extending longitudinally of and spaced apart circumferentially of the tubular cooling means, the fins of certain rows being sectional.

6. In a bottom for slagging furnaces having a liquid slag discharge opening extending therethrough, the combination of tubular cooling means comprising a pair of cooling tubes having straight portions arranged in closely spaced parallel relation and bowed portions defining a cooled lip for said opening; refractory material lining said lip; and projections on said bowed portions for retaining said refractory material in place.

7. In a bottom for slagging furnaces having a liquid slag discharge opening extending therethrough, the combination of tubular cooling means comprising a pair of cooling tubes having straight portions arranged in closely spaced parallel relation and bowed portions defining a cooled lip for said opening; refractory material lining said lip; projections on said bowed portions for retaining said refractory material in place; lateral extensions on said straight portions; refractory material retained by said lateral extensions; upright projections on said tubes extending in a crosswise direction at the juncture of the curved and straight portions; and refractory material retained by said upright projections.

8. In a bottom for slagging furnaces having a liquid slag discharge opening extending therethrough, the combination of tubular cooling means arranged to provide a cooled lip for said opening; refractory material lining said lip; and projections on said tubular cooling means for retaining said refractory material in place; said refractory material and said projections being constructed and arranged to provide a lip tapering downwardly and inwardly toward the center of said opening so as to present a sloping discharge surface exposed to radiant heat in the furnace.

9. In a bottom for slagging furnaces having a liquid slag discharge opening extending therethrough, the combination of tubular cooling means arranged to provide a cooled lip for said opening; refractory material lining said lip; and radial projections on said tubular cooling means for retaining said refractory material including a bottom radial projection constituting a drip ledge for liquid slag.

10. In a bottom for slagging furnaces having a liquid slag discharge opening extending therethrough, the combination of tubular cooling means comprising straight tubes, bowed tubes, and junction boxes joining the straight and bowed tubes, said bowed tubes and junction boxes combining to provide a cooled lip for the slag discharge opening.

11. In a furnace for burning slag forming fuel, the combination of a combustion chamber and a bottom for said chamber comprising spaced water tubes certain of which include straight and curved portions; and junction boxes joining the straight and curved portions, said curved portions and junction boxes combining to provide a liquid slag outlet in the bottom.

12. In a bottom for slagging furnaces having a liquid slag discharge opening extending therethrough, the combination of tubular cooling means for said opening comprising a pair of curved tubes, junction boxes into which the ends of said curved tubes are connected, and inlet and outlet tubes for a cooling medium connected into the junction boxes.

13. In a furnace for burning slag forming fuel, the combination of a combustion chamber, and a slagging bottom therefor having a relatively small discharge opening extending therethrough, hollow means bounding said opening, means for circulating a cooling medium therethrough, water tubes extending across said bottom, upright projections in thermal contact with said hollow means, and refractory material providing a substantially flat top surface for said bottom, said refractory material being retained at said opening by the upright projections on said hollow means.

GEORGE P. JACKSON.